Patented June 24, 1941

2,246,768

UNITED STATES PATENT OFFICE 2,246,768

METHOD OF DEHYDRATING A HYDROXYLATED FAT OR FATTY ACID OF THE RICINOLEIC SERIES

Richard T. Ubben, Elmhurst, and James R. Price, Jr., Chicago, Ill., assignors to Armstrong Paint & Varnish Works, Chicago, Ill., a corporation of Illinois No Drawing. Application October 2, 1939, Serial No. 297,434

4 Claims. (Cl. 260—398)

This invention relates to a method of dehydrating a hydroxylated fat or fatty acid of the ricinoleic series. More particularly this invention relates to the preparation of a dehydrated castor oil having drying properties and useful in the manufacture of protective films and coatings.

It has long been known to use drying oils, such as linseed, tung and the like in making protective coatings. These oils have also been used in the manufacture of modified alkyd resins, formed by the reaction of polybasic acids with polyhydric alcohols. All of these commonly used drying oils, however, are unsaturated, and therefore oxygen absorptive by nature and are ready for use after a simple refining operation.

More recently it has been proposed to convert particular non-drying oils, such as castor oil, into oils having drying properties. In the case of castor oil, its conversion into an unsaturated oil has been accomplished by means of dehydration, the removal of one molecule of water from each fatty acid radical contained in the castor oil resulting probably in two double bonds in conjugated position. The unsaturated oil so formed has drying properties rendering it useful as a component of protective films and coatings, but such an oil has thus far not proved entirely satisfactory because of possession of a slight residual tackiness that necessitates abnormal proportions of driers or of hard resins to overcome. In addition, methods of preparing this unsaturated oil from castor oil have proved cumbersome and costly, resulting in a definite increase in cost over that of raw castor oil.

According to our present invention, castor oil, or other hydroxylated fat or fatty acid of the ricinoleic series, is converted into a dehydrated product having drying properties by reaction at a relatively high temperature with phthalic anhydride or phthalic acid. While it has previously been known that castor oil and phthalic anhydride, if heated together at about 150 to 180° C., would form a relatively viscous oil, it was not heretofore appreciated, to the best of our knowledge, that a substantially completely dehydrated castor oil having good drying properties could be prepared from castor oil and phthalic anhydride by the use of notably higher temperatures, such as from 525 to 575° F.

We have found that if temperatures of that order of magnitude are employed, and preferably temperatures within the narrower range of 540 to 550° F., a clear, homogeneous dehydrated castor oil having good drying properties, and therefore useful in making protective films and coatings, can be produced. It has been known that a drying oil could be obtained by heating castor oil and phthalic anhydride. However, it is only after numerous experiments that we have determined that at about 545° F. a substantially completely dehydrated castor oil can be produced which is far superior in drying properties to a product prepared at higher or lower temperatures. At temperatures below 540° F. some dehydration takes place it is true, accompanied however with the formation of a large amount of ester polymers. At 525° F. for example, an oil which is only partially dehydrated is produced and which is very slow drying. At 575° F. dehydration takes place with ease, but as rapidly as it dehydrates it polymerizes to form large molecules which tend to block the remaining undehydrated oil from the phthalic anhydride.

It is therefore an important object of this invention to provide a method of dehydrating a hydroxylated fat or fatty acid of the ricinoleic series to obtain a product having valuable drying properties and useful as an ingredient in protective films and coatings.

It is a further important object of this invention to provide a relatively simple, economical process for preparing a dehydrated castor oil or similar product having good drying properties, by the reaction at relatively high temperatures between castor oil, or other hydroxylated fat or fatty acid of the ricinoleic series, and phthalic anhydride, or phthalic acid.

Other and further important objects of this invention will become apparent from the following description and appended claims.

The primary starting material for use in our method is a hydroxylated fat or fatty acid, preferably of the ricinoleic series, the acids of which have the general formula $C_nH_{2n-2}O_3$. The acids of this series include ricinoleic acid, isoricinoleic acid, ricinelaidic acid, ricinic acid and quince oil acid. Instead of the acids themselves, the glyceride esters of such acids, that is, the corresponding fats, may be employed. In fact, our preferred starting material is castor oil itself, which contains a substantial proportion of ricinolein, the simple triglyceride of ricinoleic acid.

One of the reasons for preferring to use castor oil as the starting material is its commercial availability. However, where castor oil is specifically referred to in the examples given hereinafter, it will be understood that other members of the ricinoleic series of fats and fatty acids may be substituted in place thereof. In fact, ricinoleic acid itself constitutes an even more satisfactory starting material than the triglycerides, since it may be more easily converted into a resin product having outstanding drying properties. It is thus merely a question of cost and availability as to which member of the generic class is used as a starting material.

In practicing our invention, using refined castor oil as the starting material, the castor oil and a suitable proportion of phthalic anhydride or phthalic acid, are charged into a reaction vessel equipped with an outside source of heat, a mechanical agitator, a reflux condenser and an inlet for the introduction of a non-oxidizing gas, such as carbon dioxide. Reaction vessels of glass, enamel, nickel, iron, or any of the iron alloys such as Monel metal, stainless steel, or the like, may be satisfactorily employed. Non-oxidizing gases, or inert gases, other than carbon dioxide, such as nitrogen, flue gas, and the like, may be used to help to preserve the light color of the product.

The charge in the reaction vessel is gradually heated, with agitation, to a temperature of between 525 and 575° F., preferably between 540 and 550° F., maintaining the charge at all times under a blanket of inert gas. During the progress of the reaction, water is split off from the castor oil as a result of the esterification action of the phthalic anhydride. The temperature and other conditions maintained in the reflux condenser are such as to permit the escape of water vapor, while returning the reacting constituents to the sphere of reaction within the vessel. The length of time required to bring the reaction to substantial completion depends upon the temperature employed and upon the percentage of phthalic anhydride used. Temperatures higher or lower than the range specified cannot be satisfactorily used, because at lower temperatures the reaction proceeds too slowly to be economical, whereas at higher temperatures the danger of gelation is too great to make such higher temperatures practical. The preferred temperature at which the reaction is carried out is 545° F., or within the range of from 540 to 550° F., within which range of temperatures the time required for substantially complete reaction is from 5 to 7 hours. In general, if the temperature is maintained at between 525 and 575° F., from 3 to 10 hours suffices for the substantial completion of the reaction. While the reaction is preferably carried out at atmospheric pressures, reduced pressures may be employed.

The substantial completion of the reaction is evidenced by the rapidity of drying of a thin film of the reaction product at elevated temperatures. By way of example, if a small proportion of cobalt naphthenate, say the equivalent of 0.5% of metallic cobalt by weight, or other suitable drier, is added to the reaction product, it should dry hard in from 1 to 2 hours if deposited as a thin film.

Since it is well known that secondary or beta hydroxyl groups are difficult to esterify and that, when once esterified, the esters are very easily hydrolyzed or broken down, it is believed that when castor oil is reacted upon by phthalic anhydride, the beta hydroxyl group of the fatty acid radical contained in castor oil is subject to esterification by the phthalic anhydride. Such esterification is evidenced by the evolution of water, which reaches a maximum as the temperature of the reaction mass approaches 545° F. At this point, namely prior to the complete dehydration of the castor oil, even though only 5 to 10% of phthalic anhydride (based upon the weight of castor oil) has been used, the initial percentage of phthalic anhydride will crystallize out of a sample of the reaction mixture when the latter is cooled. In other words, although a great deal of water of esterification has been liberated, the phthalic anhydride, at this stage of the reaction, is still present in its free form.

After the reaction has progressed to a point where the castor oil is substantially completely dehydrated, however, phthalic anhydride will no longer crystallize out from the cooled reacted mass, provided that not more than 5% of phthalic anhydride by weight of the castor oil has initially been used.

It is thus evident that the mechanism of the reaction occurs in two stages involving:

(1) The union of a molecule of phthalic anhydride with the hydroxyl group of the fatty acid radical of castor oil to form an ester, releasing water, and (2) The subsequent decomposition at higher temperatures of this ester and the reformation of phthalic anhydride, resulting in a dehydrated castor oil with the unsaturated groups in conjugated positions.

In cases where less than 5% of phthalic anhydride by weight of the castor oil has been used after the completion of the reaction, there is no free phthalic anhydride which it is necessary subsequently to esterify. However, when larger percentages of phthalic anhydride are used to dehydrate the castor oil, it is advisable subsequently to esterify the free acidic group present with a polyhydric alcohol, thereby producing a modified alkyd type resin of exceptional drying properties. The esterification of the free acidic groups with a polyhydric alcohol can satisfactorily be carried out at temperatures lower than those at which the primary reaction is effected, say at temperatures from 400 to 545° F., or, more preferably, at temperatures from 425° to 500° F.

The following examples will serve to illustrate preferred embodiments of our invention, but it will be understood that our invention is not to be limited to the specific examples:

*Example 1*

| | Parts by weight |
|---|---|
| Refined castor oil | 3900 |
| Phthalic anhydride | 100 |

The castor oil and phthalic anhydride are placed in the reaction vessel and the temperature is gradually raised to about 545° F., where it is maintained for 6½ hours. During the later stages of the heating operation, the reflux condenser is entirely removed or the conditions of reflux so controlled as to permit the escape of water of dehydration from the sphere of the reaction. Upon cooling the reaction mass, a clear, homogeneous dehydrated castor oil is obtained. A thin film of this resinous product, upon the addition thereto of a fractional percentage of cobalt naphthenate, the equivalent, say, of 0.5% of metallic cobalt by weight, will dry in from 1 to 2 hours to give a hard, non-tacky coating.

While we have found that about 2½% of phthalic anhydride by weight of castor oil gives optimum results, where the acid groups remaining in the reaction mass are not to be subsequently esterified, it is feasible to vary this percentage between 1 and 5%. The presence of the free acid groups in the reaction product apparently accelerates drying.

Although the temperature of 545° F., given above, has been found to be the optimum temperature for dehydrating castor oil by the catalytic action of phthalic anhydride, temperature variations within the range of about 525 to 575° F. are permissible. At lower temperatures the esters formed are more stable and tend to form polymeric aggregates, while at higher temperatures the dehydrated acid radicals are sufficiently active to cause gelation of the dehydrated portion of the oil, while leaving a residue of mixed glycerides of dehydrated and unchanged castor oil fatty acids.

*Example 2*

| | Parts by weight |
|---|---|
| Refined castor oil | 3800 |
| Phthalic anhydride | 140 |
| Glycerol | 60 |

The castor oil and phthalic anhydride are placed in the reaction vessel and the temperature is gradually raised to about 545° F., where it is maintained for 6½ hours. The product is then allowed to cool to about 400° F., and the glycerol is added. The temperature is again gradually raised to about 450° F. and is maintained at that point until the free acidic groups have been esterified, as evidenced by a reduction in the acid value to about 5.0 or less.

The resulting resinous product resembles an extremely heavy bodied oil, and may be used as such, or may be further modified by the incorporation of hard, oil-soluble resins to produce surface coating materials of widely variable properties. Upon the addition to this resinous product of a small amount of cobalt naphthenate, a thin film of the composition will dry hard in from 2 to 4 hours. There is a slight residual tack noticeable in films of this resin, even after the film is hard, but this is a characteristic of extremely long-oil resins and may be eliminated by the addition thereto of small amount of suitable varnish resins.

*Example 3*

| | Parts by weight |
|---|---|
| Refined castor oil | 3600 |
| Phthalic anhydride | 248 |
| Glycerol | 152 |

The method of this example is the same as that described in Examples 1 and 2, with the subsequent esterification of the free acids present with glycerol. The castor oil and phthalic anhydride are reacted as in the previous examples at 545° for 5½ hours, at which point free phthalic anhydride would crystallize out from the oil if a pill of the reaction mixture were cooled on glass. The reaction mixture is then cooled to 450° F. and the glycerol added very slowly with vigorous agitation. The temperature is held at 450° F. for 2 hours, at the end of which period the product was found to have an acid value of 5.6. The finished product is a very viscous oil or resinous material, which when thinned with mineral spirits, and driers added, gives a fast drying, clear, hard film.

*Example 4*

| | Parts by weight |
|---|---|
| Refined castor oil | 1200 |
| Phthalic anhydride | 1184 |
| Linseed oil fatty acids | 1120 |
| Glycerol | 736 |

With the foregoing proportions, advantage is taken of the extremely rapid dehydration of castor oil that occurs when approximately equal weights of castor oil and phthalic anhydride are held within our preferred temperature range of from 540 to 550° F.

The phthalic anhydride and castor oil are heated slowly to about 545° F. and held at that temperature for about 1 hour. At this point, evolution of water will practically have ceased. The fatty acids and glycerol are then added and the mixture heated for about 4 hours at about 450° F., at the end of which period the acid value of the reaction mass is from 10 to 12.

The resulting resinous product, when reduced with a suitable solvent, is ideal for enamels, where color retention, quick dry, and durability are important. As compared with other commercially available dehydrated castor oils, our resinous product possesses superior drying properties, as evidenced by the following table showing the time required for gelation at a temperature of 585° F.:

| | Minutes |
|---|---|
| Product of Example 1 | 15 |
| Product of Example 2 | 14 |
| Commercial product #1 | 25 |
| Commercial product #2 | 20 |
| Commercial product #3 | 62 |

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The method of dehydrating castor oil, which comprises heating to a temperature between 525° and 575° F. a mixture consisting of castor oil and phthalic anhydride, the proportion of phthalic anhydride being insufficient to esterify a substantial proportion of said castor oil but being capable by reaction with successive corresponding increments of said castor oil of forming increments of the phthalic ester of said castor oil, which within said temperature range is decomposed to release free phthalic anhydride for further incremental reaction, and continuing the heating within said temperature range until substantially complete dehydration of said castor oil has been effected to give directly dehydrated castor oil having conjugated double bonds.

2. The method of dehydrating a compound of the group consisting of fats and fatty acids of the ricinoleic series, which comprises heating to between 525° and 575° F. a mixture consisting essentially of such compound of the ricinoleic series and a small proportion of a compound selected from the group consisting of phthalic acid and phthalic anhydride, said proportion being less than sufficient to substantially esterify said member, continuing heating to effect successively the formation of small amounts of the phthalic ester of said member and the decomposition within said temperature range of said ester to reform free phthalic anhydride until substantially complete dehydration of said member has been effected to give a product having conjugated double bonds.

3. The method of dehydrating castor oil, which comprises heating a mixture consisting of castor oil and from 1% to 5% of phthalic anhydride by weight of the castor oil to a temperature of between 540° and 550° F. and holding said mixture within that temperature range until by the successively occurring reactions of forming small amounts of the phthalic ester of castor oil and of decomposing said ester to release free phthalic anhydride a substantially complete dehydration of said castor oil within said temperature range has been effected to produce a dehydrated castor oil having conjugated double bonds.

4. The method of dehydrating castor oil, which comprises heating to a temperature between 540° and 550° F. a reaction mixture consisting of castor oil and phthalic anhydride, the proportion of phthalic anhydride being insufficient to esterify a substantial proportion of said castor oil but being capable by reaction with successive corresponding increments of said castor oil of forming increments of the phthalic ester of said castor oil, which within said temperature range is decomposed to release free phthalic anhydride for further incremental reaction, and continuing the heating within said temperature range until substantially complete dehydration of said castor oil has been effected to give directly dehydrated castor oil having conjugated double bonds.

RICHARD T. UBBEN.
JAMES R. PRICE, Jr.